June 16, 1936. H. G. CARMICHAEL 2,044,279
METHOD OF PURIFYING COMMERCIAL CARBON DIOXIDE
Filed March 7, 1934
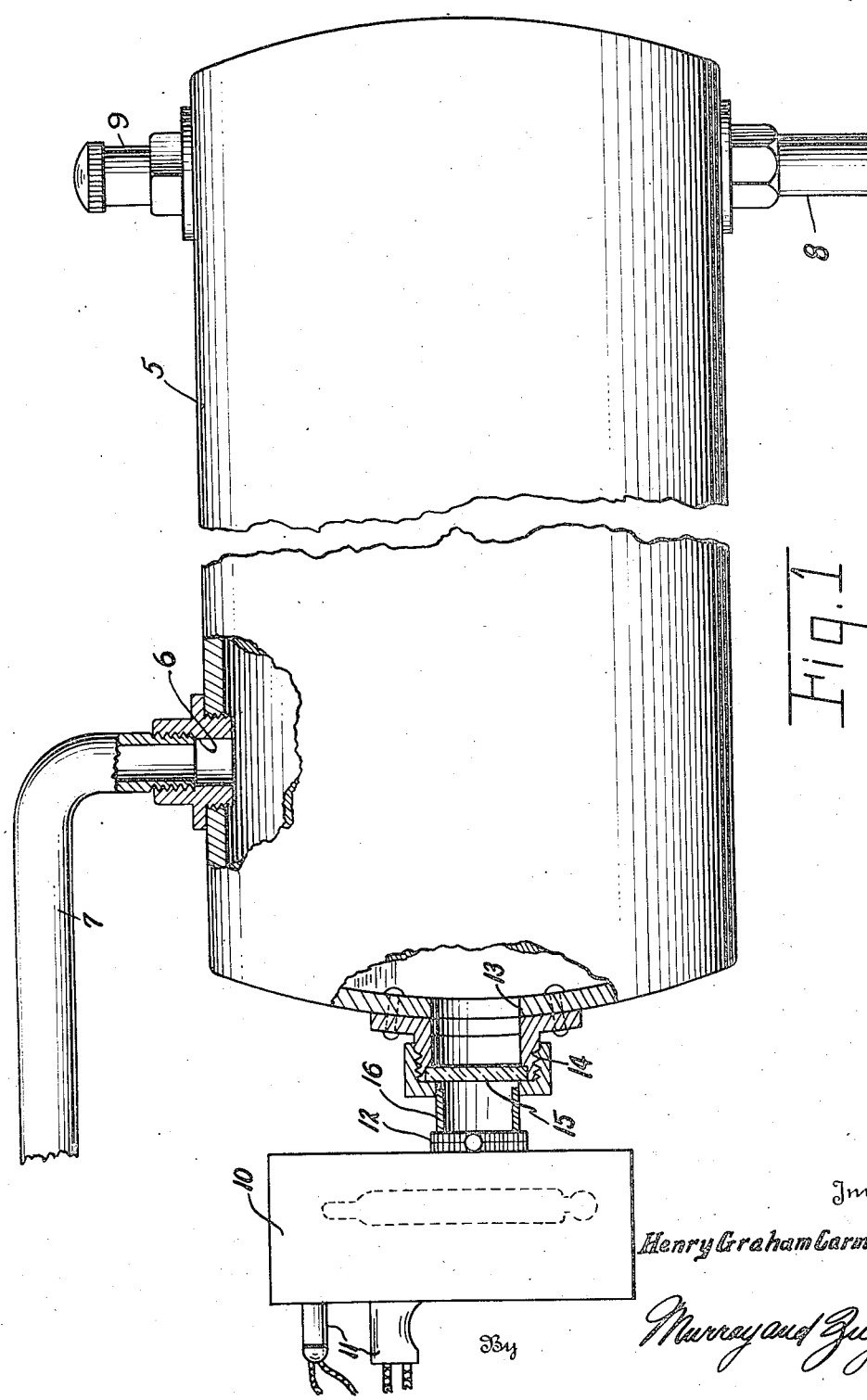
Inventor
Henry Graham Carmichael
By Murray and Zugelter
Attorneys Patented June 16, 1936

2,044,279

UNITED STATES PATENT OFFICE 2,044,279

METHOD OF PURIFYING COMMERCIAL CARBON DIOXIDE

Henry Graham Carmichael, Cincinnati, Ohio

Application March 7, 1934, Serial No. 714,537

4 Claims. (Cl. 23—150)

This invention relates to a method for treating and purifying commercial carbon dioxide to remove materials such as carbon oxi-sulphide.

An object of the invention is the sterilization of the acid.

Another object is the reduction to harmless compounds of complex sulphur compounds traces of which are commonly found in this form of carbon dioxide and which affect carbonation adversely.

Another object is the elimination or decreasing of odor generally present in the last portions of the acid to be dispensed from the container or "cylinder".

Another object is the improving of the taste and odor of carbon dioxide.

Another object is to increase the value of carbon dioxide as an anti-bacterial agent in beverages with which the acid is used.

Another object is to increase the ease and efficiency of carbonation whereby beverages of improved zest and quality may be produced.

Another object is the treating and purifying of carbonic acid gas.

These and other objects are attained by the methods and means disclosed herein and illustrated in the accompanying drawing, in which:

Fig. 1 is a side view of a tank or container having associated therewith means for practising the present invention, parts being broken away and parts shown in cross section.

Commercial carbonic acid, that is carbon dioxide, has certain undesirable characteristics including traces of foreign chemical matter, as complex sulphur compounds, that render the acid less pure, result in odor, and which detract from efficient carbonation, from the anti-bacterial properties of the acid, as well as from the taste and quality of the beverage with which the carbon dioxide is used. Moreover, the last portions of liquid carbon dioxide to be dispensed from a container contain sources of odor, such as complex carbon compounds of aldehydic nature. These are soluble in liquid $CO_2$ and commonly remain in the container or cylinder as long as any liquid remains and are only emitted with the residual gas and therefore are concentrated sufficiently to be objectionable. The present invention obviates these undesirable characteristics and the results thereof. Briefly this is accomplished by passing light rays, particularly ultra violet rays, through the carbon dioxide. This may be conveniently done, as regards liquid carbon dioxide, immediately before the latter is placed in shipping containers.

In more detail and with reference to the drawing, there may be utilized in practising this invention a tank 5, preferably of steel, and provided at the top with an inlet port 6 having a conduit 7 communicating therewith. At the bottom of the tank, an outlet port and communicating conduit 8 are provided. The tank preferably has associated therewith a safety valve 9 which may be set for approximately 1800 pounds pressure.

At one end of the tank means are provided for passing light rays through carbon dioxide inside the tank 5. The use of ultra violet rays has proved most effective and accordingly there is illustrated, conventionally, apparatus for producing such rays and comprising the light casing 10 positioned adjacent one end of tank 5 and having suitable electrical connections 11 associated therewith. The side of casing 10 adjacent the tank may be provided with a connection member 12. The adjacent end of tank 5 has an aperture 13 therein which has associated therewith a stuffing box 14 within which a quartz lens or window 15 is positioned. A tube 16 extends between and has its opposite ends engaged by the stuffing box 14 and the connection member 12, respectively.

In practising the process of this invention, the tank 5 is filled with carbon dioxide through the inlet conduit 7. The violet ray apparatus is then put into operation and the rays passed through the quartz lens 15 into and through the carbon dioxide for a period of approximately six minutes. The wave length of the rays should preferably approximate Å 2400. Thereafter the outlet port and conduit are opened simultaneously with the inlet port 6, for drawing off the treated carbon dioxide and introducing untreated acid, respectively. From this point, a continuous flow through the two portions is maintained. The capacity of the tank and ports is so calculated that all portions of the introduced carbon dioxide are subjected to the rays for the approximate six minute period. It has been found convenient to utilize a tank having a 30 pound capacity and to introduce the untreated carbon dioxide at the rate of five pounds per minute, whereby the treatment period may be substantially gauged and maintained. The treated carbon dioxide may be passed directly from tank 5 through outlet conduit 8 into suitable shipping containers or "cylinders".

Carbon dioxide, both in gaseous and in solidified form, may be likewise treated with light rays in a manner similar to that disclosed in connection with the liquid carbon dioxide. The most effective results, however, have been achieved in connection with the liquid form, as heretofore described.

It is obvious that modifications in the structure utilized in the present process may be resorted to as well as some variation in the minor details of the process described, but these are embraced within the broad idea of the invention: the subjection of the carbon dioxide to the light rays for the period of time sufficient to attain the desirable results indicated.

What is claimed is:

1. The method of transforming into innocuous substances the traces of deleterious chemical substances normally present in liquid commercial $CO_2$, said method consisting of passing ultra violet rays through the $CO_2$.

2. The method of transforming into innocuous substances the traces of deleterious chemical substances normally present in liquid commercial $CO_2$, said method consisting of passing through the $CO_2$ ultra violet rays of a wave length approximating Å 2400.

3. The process of treating and preparing liquid commercial carbon dioxide for use by the consumer, the process comprising passing liquid commercial carbon dioxide into a tank, directing ultra-violet rays through the carbon dioxide in the tank for a period of approximately six minutes, to render tasteless and odorless the traces of deleterious chemical substances normally present in liquid commercial carbon dioxide, and thereafter passing the treated carbon dioxide directly into shipping cylinders or containers.

4. The process of treating and preparing liquid commercial carbon dioxide for use by the consumer, the process comprising passing liquid commercial carbon dioxide into a tank, directing ultra-violet rays of a wave length approximating Å 2400 through said liquid in the tank during a period of approximately six minutes to render tasteless and odorless the traces of deleterious chemical substances of the class of complex sulphur compounds normally present in liquid commercial carbon dioxide, and thereafter passing the treated carbon dioxide directly into shipping cylinders or containers.

HENRY GRAHAM CARMICHAEL.